US011991799B2

(12) United States Patent
Florac et al.

(10) Patent No.: US 11,991,799 B2
(45) Date of Patent: May 21, 2024

(54) SYSTEMS, METHODS, AND DEVICES FOR CREATING A CUSTOM OUTPUT SPECTRAL POWER DISTRIBUTION

(71) Applicant: Electronic Theatre Controls, Inc., Middleton, WI (US)

(72) Inventors: William R. Florac, Verona, WI (US); Evan Gnam, Middleton, WI (US); Wendy Luedtke, Brooklyn, NY (US); Gary Bewick, Cross Plains, WI (US); Michael Wood, Austin, TX (US)

(73) Assignee: Electronic Theatre Controls, Inc., Middleton, WI (US)

( * ) Notice: Subject to any disclaimer, the term of this patent is extended or adjusted under 35 U.S.C. 154(b) by 427 days.

(21) Appl. No.: 17/501,946

(22) Filed: Oct. 14, 2021

(65) Prior Publication Data

US 2022/0124884 A1 Apr. 21, 2022

Related U.S. Application Data

(60) Provisional application No. 63/093,952, filed on Oct. 20, 2020.

(51) Int. Cl.

| | |
|---|---|
| ***H05B 45/20*** | (2020.01) |
| ***H05B 45/22*** | (2020.01) |
| ***H05B 45/3577*** | (2020.01) |
| ***H05B 47/125*** | (2020.01) |
| ***H05B 47/14*** | (2020.01) |

(52) U.S. Cl.

CPC ............ *H05B 45/20* (2020.01); *H05B 45/22* (2020.01); *H05B 45/3577* (2020.01); *H05B 47/125* (2020.01); *H05B 47/14* (2020.01)

(58) Field of Classification Search

CPC .. H05B 45/20; H05B 45/3577; H05B 47/155; H05B 47/11; H05B 47/105; H05B 45/14; H05B 47/14; H05B 45/30; H05B 45/40; H05B 47/10; H05B 45/10

See application file for complete search history.

(56) References Cited

U.S. PATENT DOCUMENTS

| | | | | |
|---|---|---|---|---|
| 6,683,423 | B2 | 1/2004 | Cunningham | |
| 8,333,631 | B2 * | 12/2012 | Emerson ................ | H05B 45/20 313/503 |
| 8,403,523 | B2 | 3/2013 | Gerlach et al. | |

(Continued)

OTHER PUBLICATIONS

Search Report issued from the United Kingdom Patent Office for related Application No. GB2114742.6 dated Feb. 24, 2022 (4 Pages).

*Primary Examiner* — Vibol Tan
(74) *Attorney, Agent, or Firm* — Michael Best & Friedrich LLP

(57) ABSTRACT

Systems, methods, and devices described herein provide for operating a lighting fixture with a plurality of light sources at a target chromaticity with a target output spectral power distribution. The methods include multiplying a first spectral power distribution by a second spectral power distribution to determine a product spectral power distribution, multiplying the product spectral power distribution by an illuminant spectral power distribution to determine the target output spectral power distribution at the target chromaticity, and driving the plurality of light sources at intensities corresponding to the target output spectral power distribution.

21 Claims, 11 Drawing Sheets

(56) References Cited

U.S. PATENT DOCUMENTS

| | | | | |
|---|---|---|---|---|
| 8,723,450 | B2 | 5/2014 | Hatley et al. | |
| 9,144,140 | B1 * | 9/2015 | Bewick | H05B 45/22 |
| 9,713,222 | B2 * | 7/2017 | Bewick | H05B 45/24 |
| 10,433,392 | B2 * | 10/2019 | Simonian | H05B 45/22 |
| 10,779,369 | B2 * | 9/2020 | Cahalane | F21V 5/007 |
| 11,240,898 | B2 * | 2/2022 | Florac | H05B 47/14 |
| 11,464,088 | B2 * | 10/2022 | Gnam | H05B 45/30 |
| 11,849,519 | B2 * | 12/2023 | Florac | H05B 47/125 |
| 2012/0081010 | A1 | 4/2012 | Hatley et al. | |
| 2012/0176063 | A1 | 7/2012 | Hatley et al. | |

* cited by examiner

SYSTEMS, METHODS, AND DEVICES FOR CREATING A CUSTOM OUTPUT SPECTRAL POWER DISTRIBUTION

RELATED APPLICATIONS

This application claims the benefit of U.S. Provisional Patent Application No. 63/093,952, filed Oct. 20, 2020, the entire content of which is hereby incorporated by reference.

FIELD

Embodiments described herein relate to controlling the spectral content of an output of a lighting fixture.

SUMMARY

Luminaires or lighting fixtures are capable of producing a wide gamut of colors by combining light from a plurality of light sources. A common way of visualizing the color gamut of a lighting fixture is using the International Commission on Illumination ("CIE") 1931 color space chromaticity diagram. The CIE 1931 color space chromaticity diagram is a two-dimensional representation of the colors in the visible spectrum in which each color is identified by an x-y coordinate (i.e., [x, y]). While the chromaticity of a color can be defined in terms of an x-y coordinate, a Y tristimulus value is used as a measure of brightness or luminance resulting in the CIE xyY color space.

The use of x-y coordinates (or other conventional metrics for relaying color information such as hue-saturation-intensity ["HSI"], red-green-blue ["RGB"], etc.) to identify colors provides a consistent technique for selecting the color outputs of luminaires or lighting fixtures. However, they do not necessarily translate to a consistent output spectrum across different lighting fixtures in that the same color can be produced by many different spectra. As such, the user is unable to precisely control the spectral content of an output of a lighting fixture using color coordinates.

Methods for driving light sources to achieve a target color as an output of a lighting fixture, as well as manually controlling the spectral content of the output of the lighting fixture, are disclosed in, for example, U.S. Pat. No. 8,723,450, the entire content of which is incorporated herein by reference. A color control methodology (e.g., HSI, RGB, etc.) is used to produce the target or desired color output from the lighting fixture, and then a user is able to manually control the spectral content of the output of the lighting fixture by increasing or decreasing the output intensity value of one or more of the light sources. Based on the user's desired change in the spectral content of the output of the lighting fixture, a new set of light source output intensity values to maintain the target color are determined and used to operate the lighting fixture.

However, conventional control of a lighting fixture output spectral content requires the user to manually and individually increase or decrease an output intensity value of one or more of the light sources. An unfamiliar user may not understand what spectral content to adjust in the lighting fixture in order to achieve a desired effect. For example, lighting designers are familiar with using conventional filters (e.g., color filters, gel filters, glass dichroic filters, etc.) to create an output color with a specific spectral power distribution from a specific light source, but would not know how to create a new color with a spectral power distribution similar to that of the conventional filter from a different light source.

Conventional filters are mounted at the lighting fixture's output end and absorb or reflect some wavelengths of light while transmitting other wavelengths of the light emitted by an illuminant (e.g., an incandescent lamp). The light passing through the filter provides an output light beam from the lighting fixture with a specific spectral composition. Several hundred different colors can be provided by use of such filters, and certain filter colors have been widely accepted as standard colors in the industry. However, the use of such physical filters is inefficient since the process of filtering out wavelengths is subtractive, and absorption of non-selected wavelengths generates heat as lost energy. The replacement of incandescent lamps and gas-discharge lamps with light emitting diodes (LEDs) provided an alternative to color filters because a desired color can instead be produced by providing electrical power in selected amounts to differently colored LEDs in the lighting fixture, with the final color produced by additive mixing of these. Methods for matching an LED fixture output to a reference filter color is disclosed, for example, in U.S. Pat. No. 6,683,423, the entire content of which is incorporated herein by reference.

Users also often prefer to work with filters of a given manufacturer (e.g., within a filter family). While sometimes this is out of convenience or custom, there may also be a spectral purpose. For example, a particular "filter family" may have certain desirable spectral similarities whether by design or by the nature of its manufacturing method. Even in cases where multiple manufacturers offer filters that would produce nominally identical chromaticities, the spectrums used to achieve those chromaticities may vary widely.

In addition, conventional control techniques provide no ability to operate a lighting fixture output at a desired color with a spectral content (i.e., a spectral power distribution) similar to that of other known spectral power distributions. For example, a lighting designer may be familiar with an industry standard green filter that produces a green color with a specific spectral power distribution. The lighting designer may want to select another green variant color (e.g., a lime-green) while maintaining as many of the similarities to the well-known green filter. This new color (lime-green) can be produced by the lighting fixture with several different spectral power distributions (i.e., metamer control), but the lighting designer has no understanding as to how to create the new color while maintaining characteristics from a known spectral power distribution. Specifically, one characteristic the lighting designer may want to recreate from a known filter is a color's "feel" or how the lighting fixture light output on an object appears to an observer. The "feel" or observer perception of an object illuminated by a lighting fixture output is determined, at least in part, by the spectral power distribution of the lighting fixture light output.

Methods described herein provide for operating a lighting fixture with a plurality of light sources at a target chromaticity with a target output spectral power distribution. The methods include determining a first distance between the target chromaticity and a first chromaticity with a first spectral power distribution, determining a second distance between the target chromaticity and a second chromaticity with a second spectral power distribution, and scaling the first spectral power distribution by a first scaling factor to arrive at a first scaled spectral power distribution. The first scaling factor is based on the first distance. The methods also include scaling the second spectral power distribution by a second scaling factor to arrive at a second scaled spectral power distribution. The second scaling factor is based on the second distance. The methods also include adding the first scaled spectral power distribution and the second scaled spectral power distribution to arrive at the target output spectral power distribution at the target chromaticity, and driving the plurality of light sources at intensities corresponding to the target output spectral power distribution.

In some aspects, the first distance is measured between MacAdam-ellipses corresponding to the target chromaticity and the first chromaticity in the CIE 1931 x-y color space.

In some aspects, the first distance is the Euclidean distance between the target chromaticity and the first chromaticity in the CIE 1960 u-v color space.

In some aspects, the first distance is the ΔE between the target chromaticity and the first chromaticity in the CIE L*a*b* color space.

In some aspects, the first distance is the sum of the absolute difference of the cartesian coordinates of the target chromaticity and the first chromaticity.

In some aspects, the first scaling factor is based on a user preference.

In some aspects, the user preference is an amount of a waveband in the output spectral power distribution.

In some aspects, the first scaling factor is based on a weighting function.

In some aspects, the weighting function is a polynomial function.

In some aspects, the weighting function is an exponential or logarithmic function.

In some aspects, the first chromaticity with the first spectral power distribution corresponds to the chromaticity and spectral power distribution resulting from the use of a filter in front of an illuminant.

In some aspects, the first chromaticity with the first spectral power distribution corresponds to the chromaticity and spectral power distribution of a tungsten lamp.

In some aspects, the first chromaticity with the first spectral power distribution corresponds to a user-created spectral power distribution.

In some aspects, the first chromaticity with the first spectral power distribution corresponds to a physical emission spectrum.

Methods described herein provide for operating a lighting fixture with a plurality of light sources at a target chromaticity with a target output spectral power distribution. The methods include multiplying a first spectral power distribution by a second spectral power distribution to determine a product spectral power distribution, multiplying the product spectral power distribution by an illuminant spectral power distribution to determine the target output spectral power distribution at the target chromaticity, and driving the plurality of light sources at intensities corresponding to the target output spectral power distribution.

In some aspects, the product spectral power distribution corresponds to the spectral power distribution resulting from a combination of at least two filters in front of an illuminant.

In some aspects, the illuminant spectral power distribution corresponds to the spectral power distribution of a tungsten lamp.

Methods described herein provide for operating a lighting fixture with a plurality of light sources at a target chromaticity with a target output spectral power distribution. The methods include exponentiating a first spectral power distribution by an exponent to determine an exponential spectral power distribution, multiplying the exponential spectral power distribution by an illuminant spectral power distribution to determine the target output spectral power distribution at the target chromaticity, and driving the plurality of light sources at intensities corresponding to the target output spectral power distribution.

In some aspects, the exponent corresponds to a user-selected opacity.

In some aspects, the user-selected opacity is a negative value.

In some aspects, the illuminant spectral power distribution corresponds to the spectral power distribution of a tungsten lamp.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

DETAILED DESCRIPTION

Figure 1:
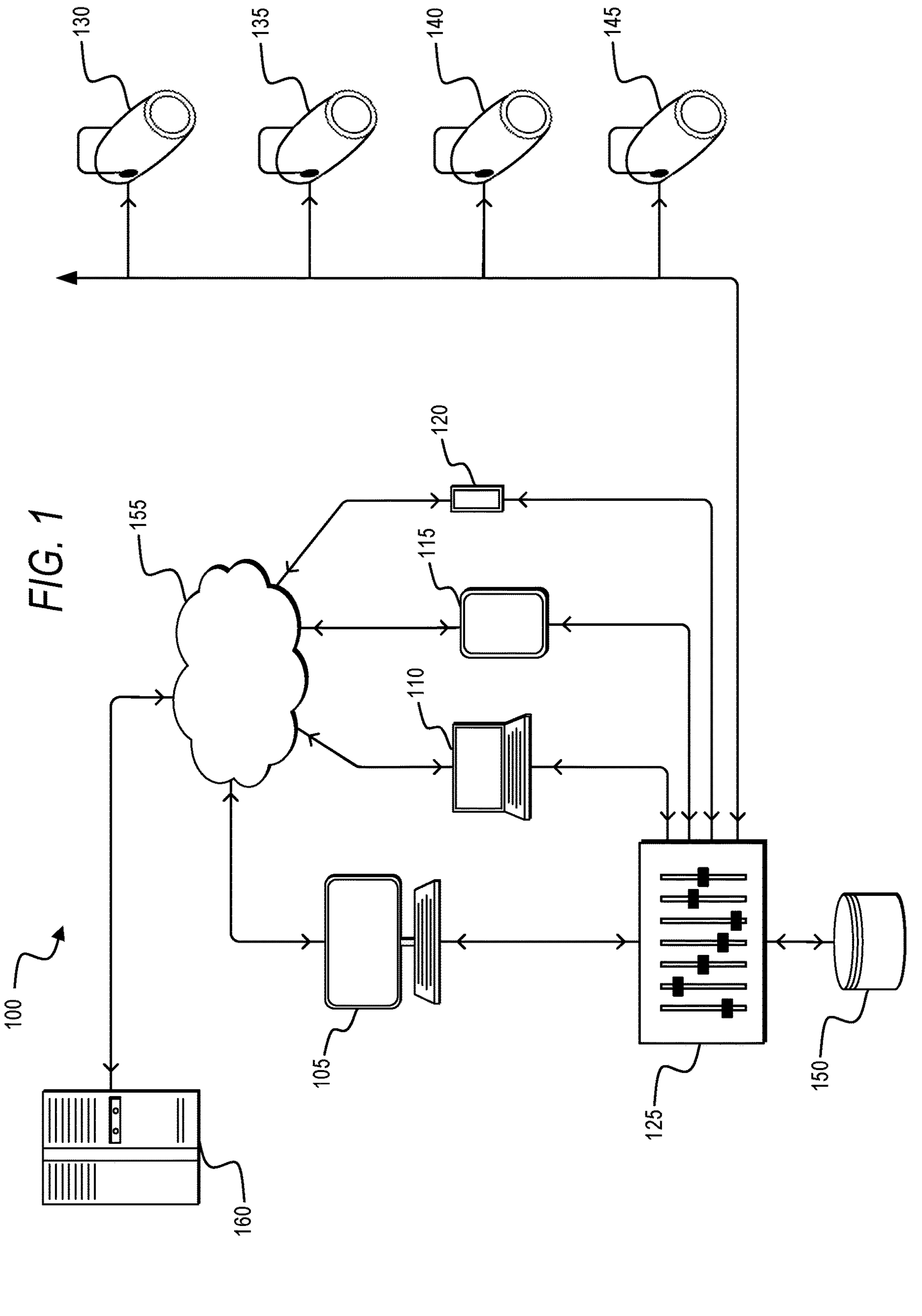
FIG. 1 illustrates a lighting system for controlling one or more LED lighting fixtures.

FIG. 1 illustrates a lighting system 100 for controlling a plurality of LED light fixtures. The system 100 includes a plurality of user input devices 105-120, a control board or control panel 125, a first light fixture 130, a second light fixture 135, a third light fixture 140, a fourth light fixture 145, a database 150, a network 155, and a server-side mainframe computer or server 160. The plurality of user input devices 105-120 include, for example, a personal or desktop computer 105, a laptop computer 110, a tablet computer 115, and a mobile phone (e.g., a smart phone) 120.

Each of the devices 105-120 is configured to communicatively connect to the server 160 through the network 155 and provide information to, or receive information from, the server 160 related to the control or operation of the system 100. Each of the devices 105-120 is also configured to communicatively connect to the control board 125 to provide information to, or receive information from, the control board 125. The connections between the user input devices 105-120 and the control board 125 or network 155 are, for example, wired connections, wireless connections, or a combination of wireless and wired connections. Similarly, the connections between the server 160 and the network 155 or the control board 125 and the light fixtures 130-145 are wired connections, wireless connections, or a combination of wireless and wired connections.

The network 155 is, for example, a wide area network ("WAN") (e.g., a TCP/IP based network), a local area network ("LAN"), a neighborhood area network ("NAN"), a home area network ("HAN"), or personal area network ("PAN") employing any of a variety of communications protocols, such as Wi-Fi, Bluetooth, ZigBee, etc. In some implementations, the network 155 is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3 GSM network, a 4 GSM network, a 4G LTE network, a 5G New Radio, a Digital Enhanced Cordless Telecommunications ("DECT") network, a Digital AMPS ("IS-136/TDMA") network, or an Integrated Digital Enhanced Network ("iDEN") network, etc. In some embodiments, the network 155 is internal and local to the server 160. For example, an integrated system with a database, storage, keyboard, controllers may be provided. In some embodiments, network connections to the light fixtures 130-145 may be formed with DMX-512 networks.

Figure 2:
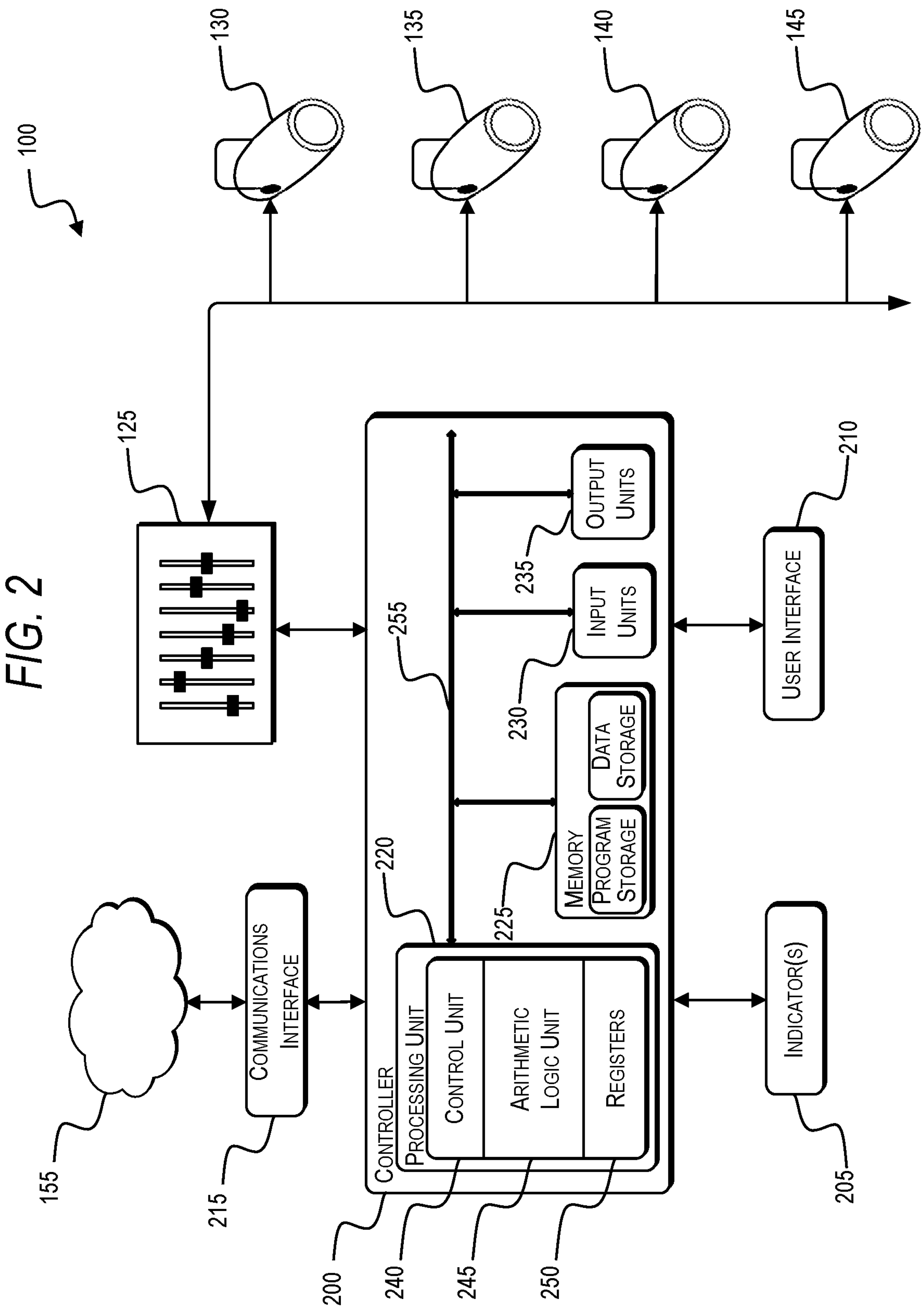
FIG. 2 is a block diagram of a lighting control system for the lighting fixture of FIG. 1.

FIG. 2 illustrates a controller 200 for the system 100. The controller 200 is electrically and/or communicatively connected to a variety of modules or components of the system 100. For example, the illustrated controller 200 is connected to one or more indicators 205 (e.g., LEDs, a liquid crystal display ["LCD"], etc.), a user input or user interface 210 (e.g., a user interface of the user input device 105-120 in FIG. 1), and a communications interface 215. The controller 200 is also connected to the control board 125. The communications interface 215 is connected to the network 155 to enable the controller 200 to communicate with the server 160. The controller 200 includes combinations of hardware and software that are operable to, among other things, control the operation of the system 100, control the operation of the light fixtures 130-145, communicate over the network 155, communicate with the control board 125, receive input from a user via the user interface 210, provide information to a user via the indicators 205, etc.

In the embodiment illustrated in FIG. 2, the controller 200 would be associated with one of the user input devices 105-120. As a result, the controller 200 is illustrated in FIG. 2 is being connected to the control board 125 which is, in turn, connected to the first light fixture 130, the second light fixture 135, the third light fixture 140, and the fourth light fixture 145. In other embodiments, the controller 200 is included within the control board 125, and, for example, the controller 200 can provide control signals directly to the first light fixture 130, the second light fixture 135, the third light fixture 140, and the fourth light fixture 145. In some embodiments, the controller 200 is associated with (e.g., included within) a light fixture 130-145. In other embodiments, the controller 200 is associated with the server 160 and communicates through the network 155 to provide control signals to the control board 125 and the first light fixture 130, the second light fixture 135, the third light fixture 140, and the fourth light fixture 145. Spectral power distributions known in the industry or created by a user can be stored on the server 160 and accessed from the server 160.

The controller 200 includes a plurality of electrical and electronic components that provide power, operational control, and protection to the components and modules within the controller 200 and/or the system 100. For example, the controller 200 includes, among other things, a processing unit 220 (e.g., a microprocessor, a microcontroller, or another suitable programmable device), a memory 225, input units 230, and output units 235. The processing unit 220 includes, among other things, a control unit 240, an arithmetic logic unit ("ALU") 245, and a plurality of registers 250 (shown as a group of registers in FIG. 2), and is implemented using a known computer architecture (e.g., a modified Harvard architecture, a von Neumann architecture, etc.). The processing unit 220, the memory 225, the input units 230, and the output units 235, as well as the various modules or circuits connected to the controller 200 are connected by one or more control and/or data buses (e.g., common bus 255). The control and/or data buses are shown generally in FIG. 2 for illustrative purposes. The use of one or more control and/or data buses for the interconnection between and communication among the various modules, circuits, and components would be known to a person skilled in the art in view of the embodiments described herein.

The memory 225 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 220 is connected to the memory 225 and executes software instructions that are capable of being stored in a RAM of the memory 225 (e.g., during execution), a ROM of the memory 225 (e.g., on a generally permanent basis), or another non-transitory computer readable medium such as another memory or a disc. Software included in the implementation of the system 100 and controller 200 can be stored in the memory 225 of the controller 200. The software includes, for example, firmware, one or more applications, program data, filters, rules, one or more program modules, and other executable instructions. The controller 200 is configured to retrieve from the memory 225 and execute, among other things, instructions related to the control processes and methods described herein. Spectral power distributions known in the industry or created by a user can be stored in the memory 225 and accessed from the memory 225. In other embodiments, the controller 200 includes additional, fewer, or different components.

The user interface 210 is included to provide user control of the system 100 and/or light fixtures 130-145. The user interface 210 is operably coupled to the controller 200 to control, for example, drive signals provided to the light fixtures 130-145, and generate and provide control signals to corresponding driver circuits. The user interface 210 can include any combination of digital and analog input devices required to achieve a desired level of control for the system 100. For example, the user interface 210 can include a computer having a display and input devices, a touch-screen display, a plurality of knobs, dials, switches, buttons, faders, or the like. In the embodiment illustrated in FIG. 2, the user interface 210 is separate from the control board 125. In other embodiments, the user interface 210 is included in the control board 125. In some embodiment, the user interface 210 is separated from the control system 100 (e.g., as a portable device wirelessly communicatively connected to the controller 200).

The controller 200 is configured to work in combination with the control board 125 to provide direct drive signals to the light fixtures 130-145. As described above, in some embodiments, the controller 200 is configured to provide direct drive signals to the light fixtures 130-145 without separately interacting with the control board 125 (e.g., the control board 125 includes the controller 200). The direct drive signals that are provided to the light fixtures 130-145 are provided, for example, based on a user input received by the controller 200 from the user interface 210.

As illustrated in FIG. 2, the controller 200 is connected to light fixtures 130-145. In some embodiments, each light fixture 130-145 includes a chip-on-board ("COB") light source. A four light fixture embodiment is illustrated for exemplary purposes only. In other embodiments, five or more light fixtures are used to further enhance the system 100's ability to produce visible light. Conversely, in other implementations, fewer than four light fixtures are used (i.e., one or two light modules). In some embodiments, the light fixtures 130-145 are light emitting diode ("LED") light fixtures.

Figure 3:
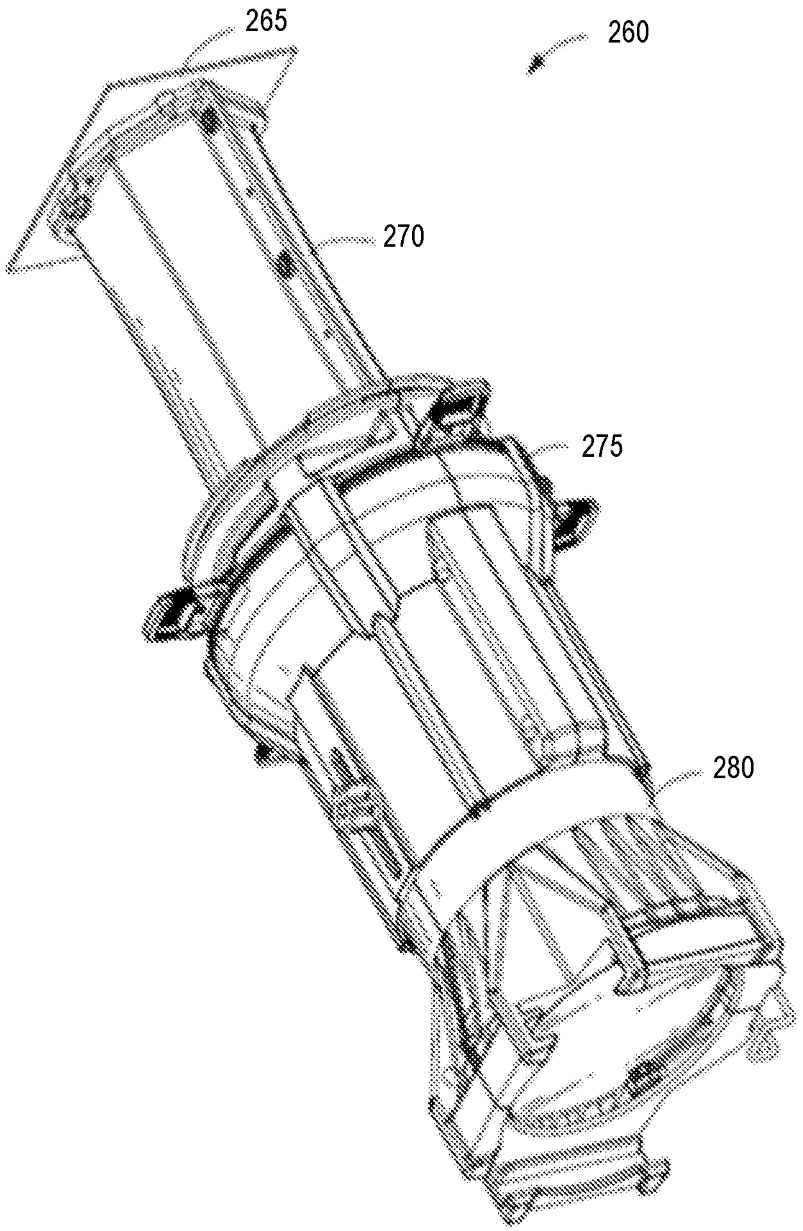
FIG. 3 is a perspective view of a lighting fixture with a LED light source.

FIG. 3 illustrates a lighting fixture 260 (i.e., a luminaire) that can be used, for example, in entertainment lighting, architectural lighting, etc. The lighting fixture 260 includes a light source 265 that produces light, a mixing assembly 270 that mixes the light, a gate assembly 275 through which the light passes after exiting the mixing assembly 270, and a lens assembly 280 that receives the light from the gate assembly 275 and projects it toward the target or desired location. The light source 265 includes an LED assembly that is configured to produce light in multiple wave lengths. The LED assembly includes a substrate in the form of a printed circuit board supporting a plurality of the LEDs. The plurality of LEDs may, for example, be arranged in an array (e.g., an LED array). In some embodiments, the LED array is hexagonal. It should be understood that the precise type, number, and positioning of the LEDs can be modified substantially without departing from the teachings disclosed herein. For purposes of description herein, the lighting fixture 260 could be any one of the light fixtures 130-145.

Figure 4:
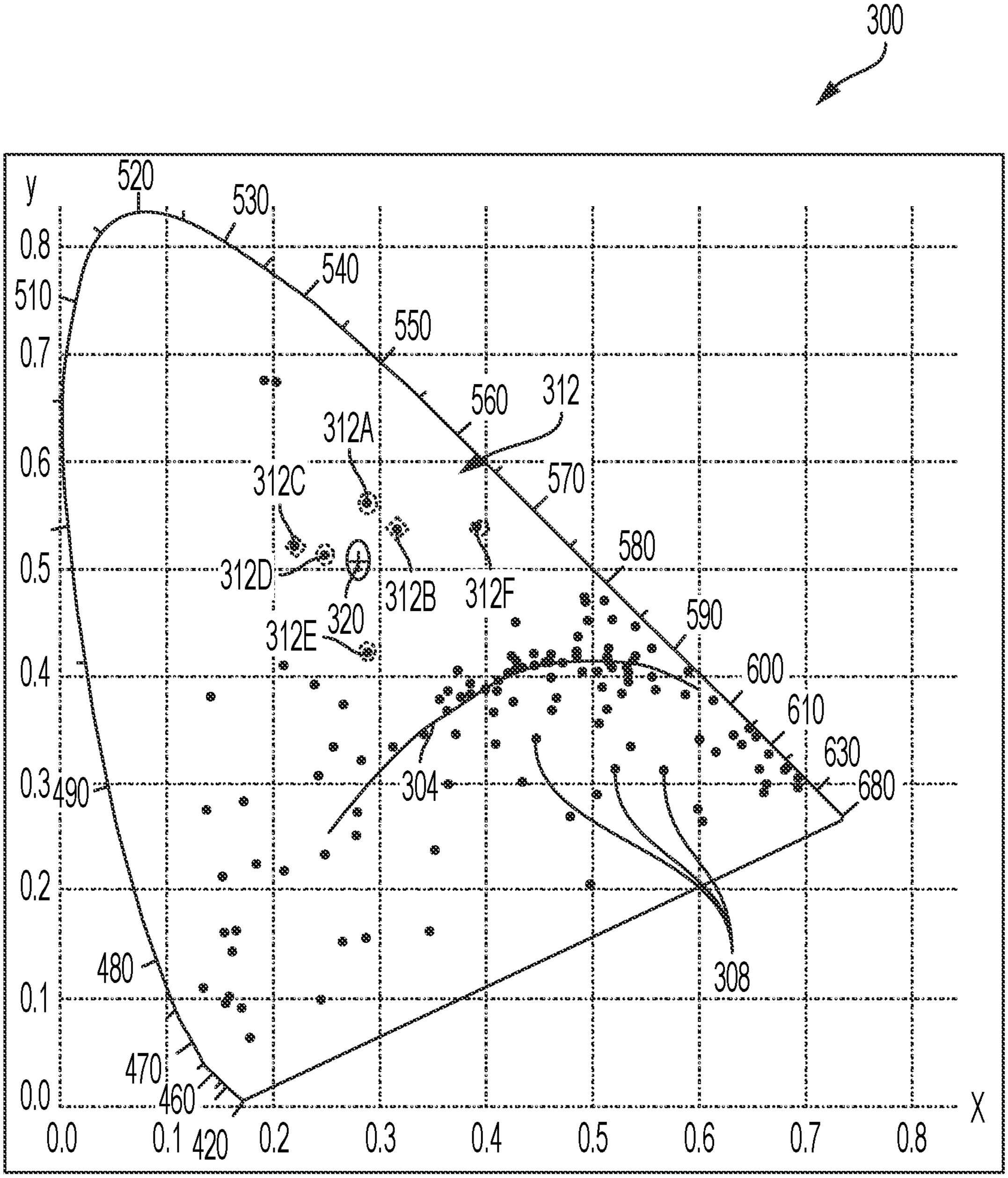
FIG. 4 is a graph of the CIE 1931 color space illustrating reference chromaticities and a target chromaticity.
Figure 5:
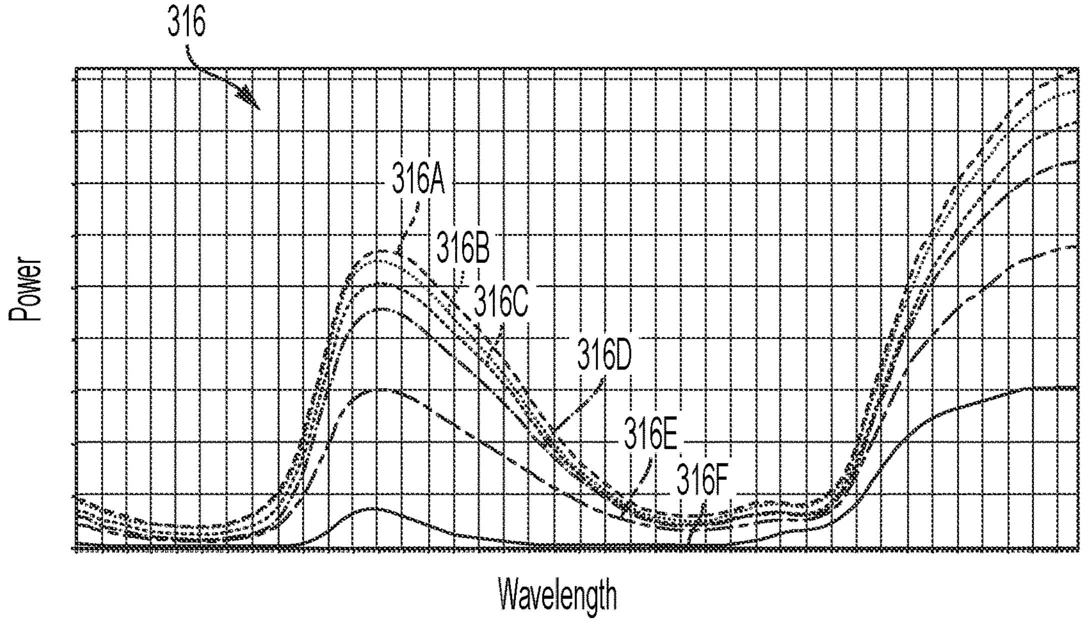
FIG. 5 is a graph of spectral power distributions for the reference chromaticities of FIG. 4.

With reference to FIG. 4, the CIE 1931 color space 300 is illustrated with the Planckian locus 304 shown. In addition, a plurality of chromaticities 308 are illustrated within the color space 300. In some embodiments, each of the plurality of chromaticities 308 correspond to conventional filters that could be used with incandescent lamps. Any number of the chromaticities 308 are selected as reference chromaticities 312. In the illustrated embodiment, there are six reference chromaticities 312. For each of the reference chromaticities 312, there is a corresponding spectral power distribution 316 (see, e.g., FIG. 5). For example, the reference chromaticities 312 include a first chromaticity 312A with a first spectral power distribution 316A, a second chromaticity 312B with a second spectral power distribution 316B, a third chromaticity 312C with a third spectral power distribution 316C, a fourth chromaticity 312D with a fourth spectral power distribution 316D, a fifth chromaticity 312E with a fifth spectral power distribution 316E, and a sixth chromaticity 312F with sixth spectral power distribution 316F. The reference chromaticities 312 and their corresponding spectral power distributions 316 may be stored in the memory 225 of the controller 200. A target or desired chromaticity 320 (i.e., a target color) is also illustrated in the color space 300. In the illustrated embodiment, the reference chromaticities 312 are the six closest colors to the desired chromaticity 320 in the x-y CIE 1931 color space 300. In some embodiments the desired chromaticity 320 is selected by a user. In other embodiments, the desired chromaticity 320 is automatically selected by the processing unit 220 based on user preferences or settings.

With the desired chromaticity 320 indicated or selected, a corresponding desired output spectral power distribution based on the reference chromaticities 308 and their corresponding spectral power distributions 316 is determined or calculated. The desired output spectral power distribution for the desired chromaticity 320 is determined based on at least one reference spectral power distribution 316. Several embodiments for determining the desired output spectral power distribution based on at least one reference spectral power distribution are disclosed herein.

A first method to determine the desired output spectral power distribution based on at least one reference spectral power distribution is an interpolative method. Let $\{\vec{S}_n\}$ be a set of known spectral power distributions at determined chromaticities 312. See, for example, the reference chromaticities 312 with reference spectral power distributions $S_1$, $S_2$, $S_3$ . . . $S_n$ in FIG. 6. For a user-selected target chromaticity 320, the corresponding desired spectral power distribution $\vec{T}$ is determined by EQN. 1:

$$\vec{T}=\sum_{i=1}^{n} f(d_i,p_i)*\vec{S}_i \quad \text{EQN. 1}$$

where $d_i$ represents a chromaticity distance, $p_i$ represents a generalized preference parameter determined heuristically or through explicit user interaction, and where f represents a generalized weighting function (e.g., polynomial, power, logarithmic, exponential, etc.). In some embodiments, the generalized preference parameter is based on a user preference. Specifically, the user preference may be a desired amount of a particular waveband (e.g., color channel) in the output spectral power distribution.

Figure 6:
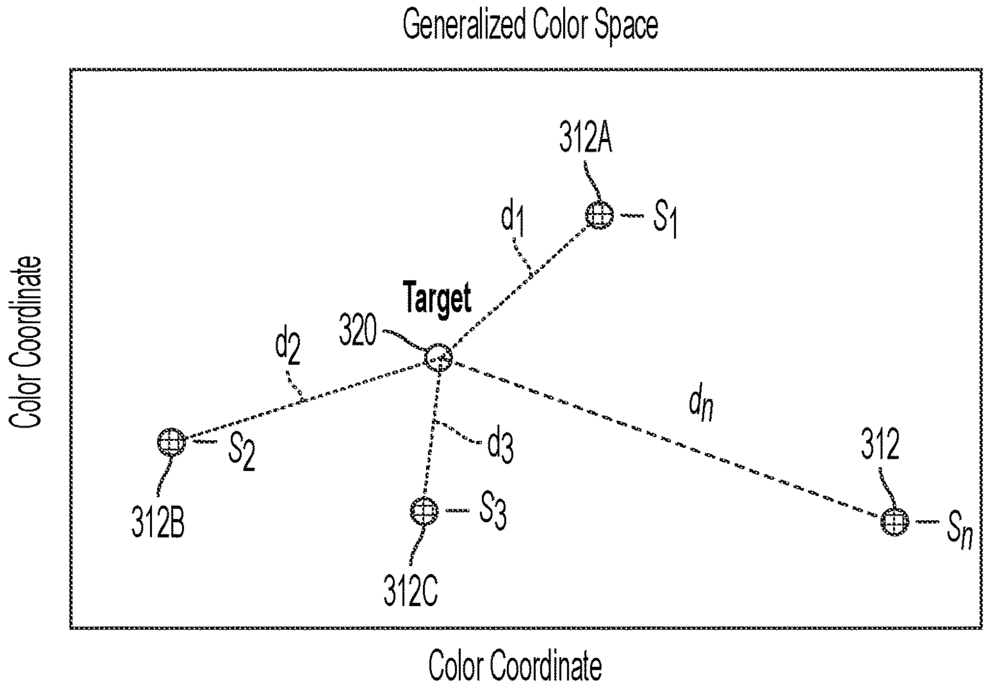
FIG. 6 illustrates distances between reference chromaticities and a target chromaticity in a generalized color space.

With reference to FIG. 6, the chromaticity distance $d_i$ (i.e., $d_1$, $d_2$, $d_3$ . . . $d_n$) is representative of how far away the reference chromaticities 312 are from the target chromaticity 320. The chromaticity distance, $d_1$, can be computed using one or more of the following values: MacAdam-ellipses in the CIE 1931 x-y color space; Euclidean distance in the CIE 1960 u-v color space; ΔE* in the L*a*b* color space; the Manhattan distance in a discretized color space (i.e., the taxicab distance, the sum of the absolute difference of the cartesian coordinates); or some other uniquely-determined distance in a color space. In some embodiments, the first distance is measured between MacAdam ellipses corresponding to the desired chromaticity and the first chromaticity in the CIE 1931 x-y color space. In other embodiments, the first distance is the Euclidean distance between the desired chromaticity and the first chromaticity in the CIE 1960 u-v color space. In other embodiments, the first distance is the delta E (ΔE*) between the desired chromaticity and the first chromaticity in the CIE L*a*b* color space. In other embodiments, the first distance is the sum of the absolute difference of the cartesian coordinates of the desired chromaticity and the first chromaticity.

The weighting function, f, is configured to ensure or prioritize one or more of the following: continuity in the target spectrum at different chromaticities; consistency between the target spectrum and various elements of known spectral power distributions at determined chromaticities; or algorithm performance in a particular luminaire.

The known spectral power distributions $\{\vec{S}_n\}$ used in the interpolative method can be various subsets of reference chromaticities 308. For example, in some embodiments, $\{\vec{S}_n\}$ is a subset (proper or improper) of a family or families of conventional filters, known to those practiced in the art, and with a user-configurable illuminant, including, but not limited to, CIE standard illuminants. In other embodiments, $\{\vec{S}_n\}$ is a subset (proper or improper) of a family or families of prior user-created spectral power distributions, stored by the user in the memory 225 in advance and recalled for the present calculation. In still other embodiments, $\{\vec{S}_n\}$ is a subset (proper or improper) of a family or families of physical emission spectra (e.g., thermal blackbody emission, biological phosphorescence, or spectra of various chemical elements or compounds). As a result, the known spectral power distributions from which to interpolate the target spectral power distribution can be the spectral power distributions from filters, tungsten lamps, black body emitters, etc.

Figure 7:
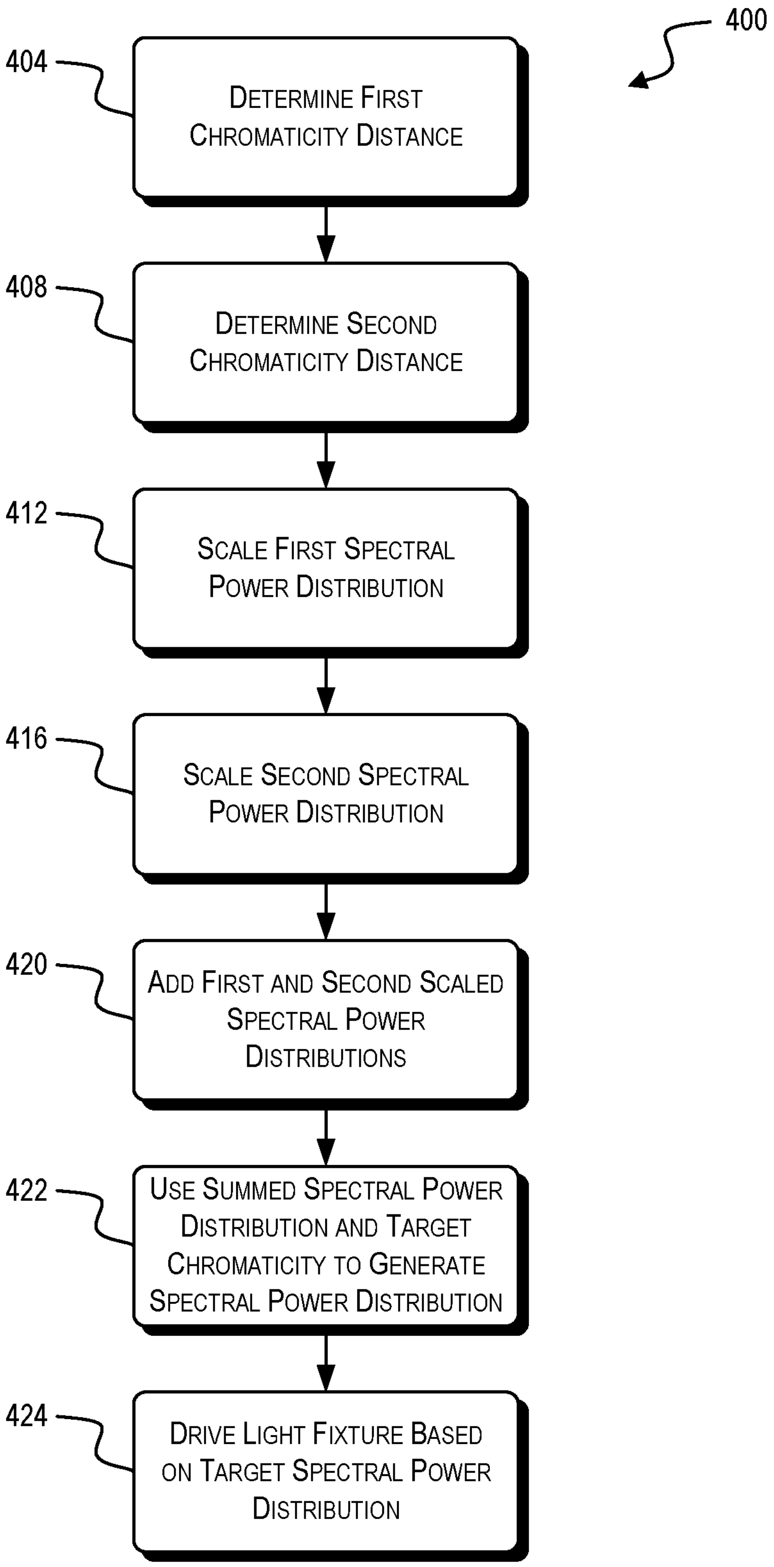
FIG. 7 is a flow diagram of a method for determining a target spectral power distribution.
Figure 8:
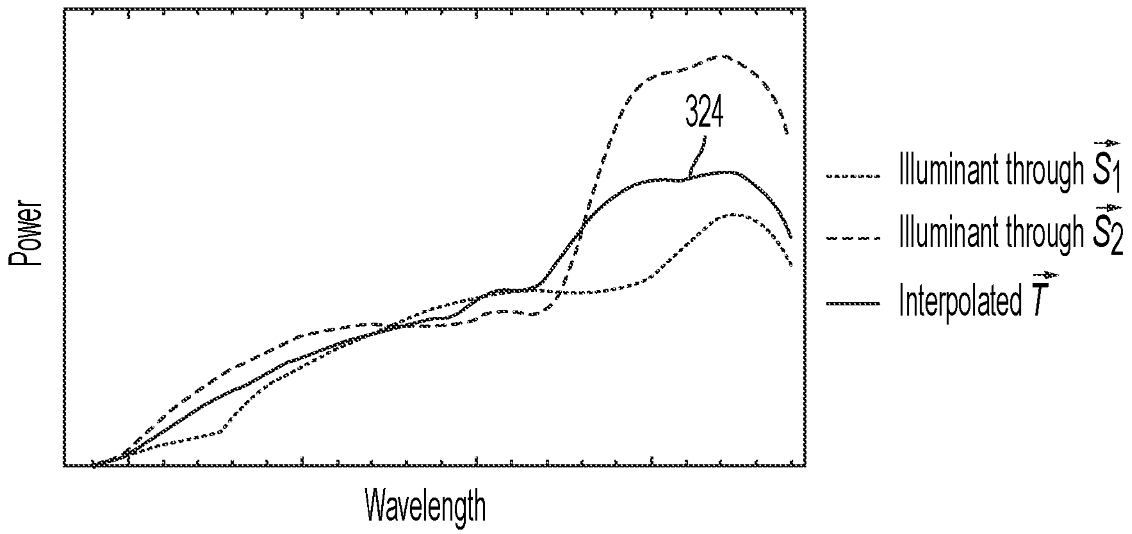
FIG. 8 is a graph of two reference spectral power distributions and an interpolated spectral power distribution based on the two reference spectral power distributions.

FIG. 7 is a method 400 for controlling and operating the lighting fixtures 130-145 at the desired chromaticity 320 with the desired output spectral power distribution, $\vec{T}$. The method 400 includes determining a first distance, $d_1$, between the desired chromaticity 320 and a first chromaticity 312A with a first spectral power distribution $S_1$ (STEP 404). The method 400 also includes determining a second distance, $d_2$, between the desired chromaticity 320 and a second chromaticity 312B with a second spectral power distribution $S_2$ (STEP 408). STEP 412 includes scaling the first spectral power distribution $S_1$ by a first scaling factor to arrive at a first scaled spectral power distribution. The first scaling factor is based on the first distance $d_1$. Likewise, STEP 416 includes scaling the second spectral power distribution $S_2$ by a second scaling factor to arrive at a second scaled spectral power distribution. The second scaling factor is based on the second distance $d_2$. In the illustrated embodiments, the scaling at STEP 412 and STEP 416 is performed according to EQN. 1. As such, the first and second scaling factors are determined by the weighting function, f, of EQN. 1. At STEP 420, the first scaled spectral power distribution and the second scaled spectral power distribution are added together (i.e., summed) to arrive at a summed spectral power distribution. Next, STEP 422 includes using the summed spectral power distribution and the desired chromaticity 320 to generate a target output spectral power distribution 324. In some embodiments, STEP 422 can include calculating a spectral power distribution using conventional methods, such as those described in U.S. Pat. No. 8,723,450, the entire content of which is incorporated herein. In other words, using EQN. 1 and reference spectral power distributions, the target output spectral power distribution is determined. For example, with reference to FIG. 8, the target output spectral power distribution 324 is determined from reference spectral power distributions $S_1$ and $S_2$. Next, STEP 424 includes driving the plurality of light sources (i.e., the plurality of LEDs) within the lighting fixtures 130-145 at power intensities that correspond to the desired output spectral power distribution.

A second method to determine the desired output spectral power distribution based on at least one reference spectral power distribution is a multiplicative method. Let $\{\vec{S}_n\}$ be a user-selected set of known spectral transmissivities, for example, theatrical filters, and let $\vec{I}$ be a user-configurable illuminant. The corresponding target spectral power distribution $\vec{T}$ is determined by EQN. 2:

$$\vec{T} = \vec{I} * \Pi_{i=1}^{n} \vec{S}_i \qquad \text{EQN. 2}$$

The multiplicative method is operable to simulate the physical stacking (i.e., "sandwich") of a plurality of physical filters. Filter stacking or a filter sandwich was traditionally used to achieve a desired affect by combining more than one physical filter in series at the output of a lighting fixture. The multiplicative method can produce a discrete set of chromaticities (since $\{\vec{S}_n\}$ is finite). In some embodiments, the multiplication is on a by-wavelength basis. Practically, the number of subsets of $\{\vec{S}_n\}$ is extremely large, so the limiting factor becomes the discretization and addressable color space of the luminaire. In some embodiments, a user may select a target chromaticity and at least one known spectral transmissivity $\vec{S}$ and illuminant $\vec{I}$, and compute a minimally-different spectral target $\vec{T}$.

Figure 9:
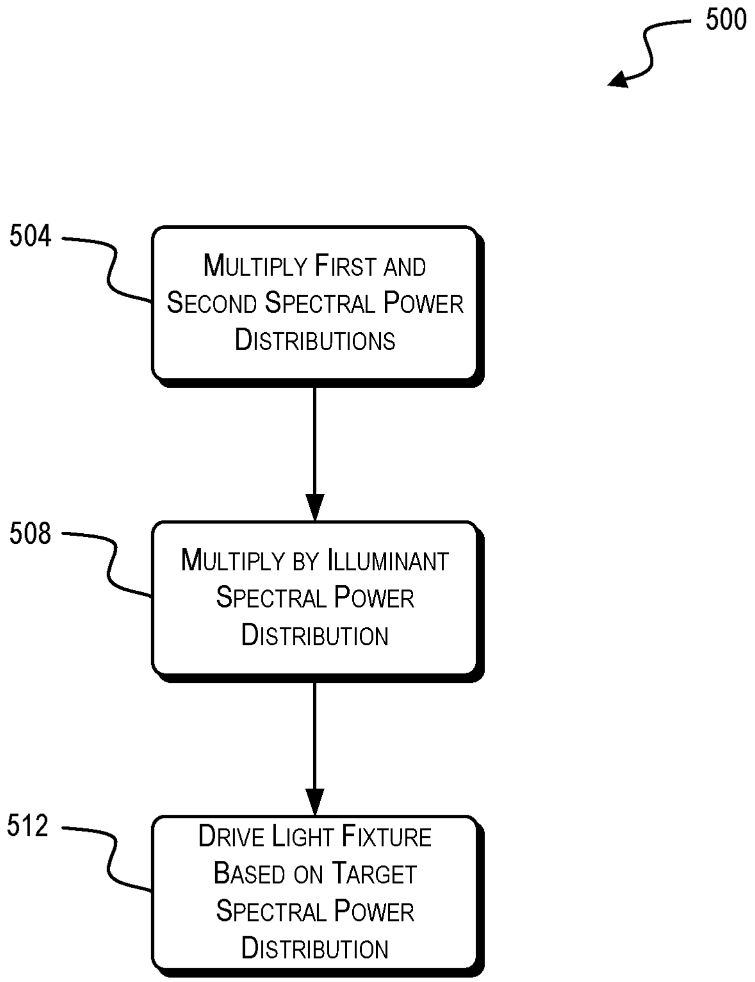
FIG. 9 is a flow diagram of a method for determining a target spectral power distribution.
Figure 10:
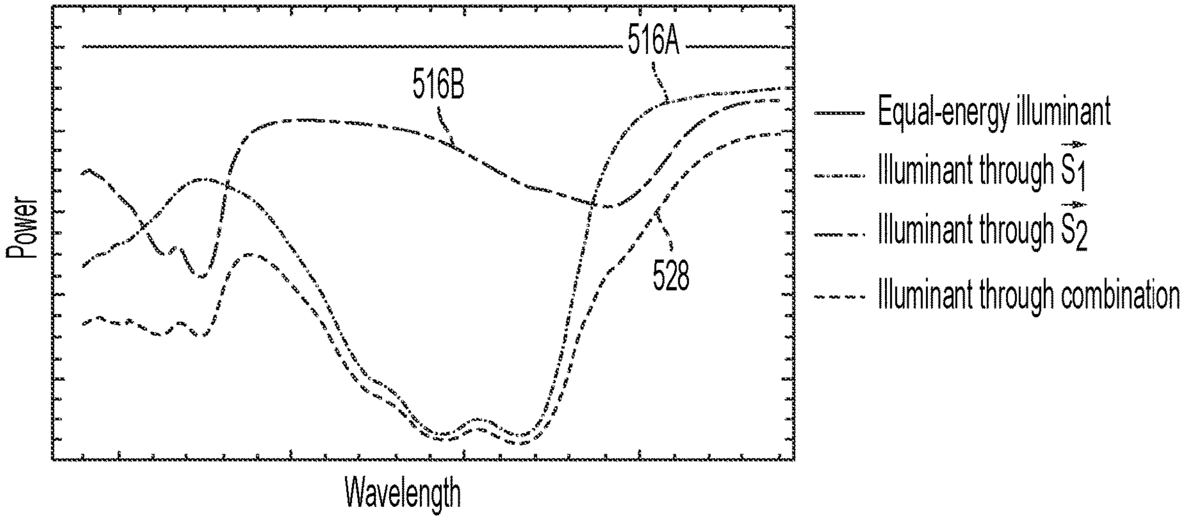
FIG. 10 is a graph of two reference spectral power distributions and a multiplicative spectral power distribution based on the two reference spectral power distributions.

FIG. 9 is a method 500 for controlling and operating the lighting fixtures 130-145 at the desired chromaticity with the desired output spectral power distribution. The method 500 includes multiplying a first spectral power distribution 516A (see FIG. 10) by a second spectral power distribution 516B (see FIG. 10) to arrive at a product spectral power distribution (STEP 504). In some embodiments, the product spectral power distribution corresponds to the spectral power distribution resulting from a combination of at least two physical filters (e.g., two gel filters). The method 500 also includes multiplying the product spectral power distribution by an illuminant spectral power distribution, I, to arrive at the desired output spectral power distribution 528 at the desired chromaticity (STEP 508). In some embodiments, the illuminant spectral power distribution corresponds to the spectral power distribution of a tungsten lamp. In some embodiments, STEP 504 and STEP 508 are reversed or combined into a single step, corresponding to EQN. 2. Next, at STEP

512, the plurality of light sources (i.e., the plurality of LEDs) within the lighting fixtures 130-145 are driven at intensities that correspond to the desired output spectral power distribution 528.

A third method to determine the desired output spectral power distribution based on at least one reference spectral power distribution is a logarithmic or exponential method. Let S be a user-selected spectral transmissivity, such as a theatrical filter. For a user-selected opacity (or alternatively, optical depth) τ and user-configurable illuminant $\vec{I}$, the corresponding target spectral power distribution $\vec{T}$ is determined by EQN. 3:

$$\vec{T} = \vec{I} * \vec{S}^{\tau} \qquad \text{EQN. 3}$$

Figure 11:
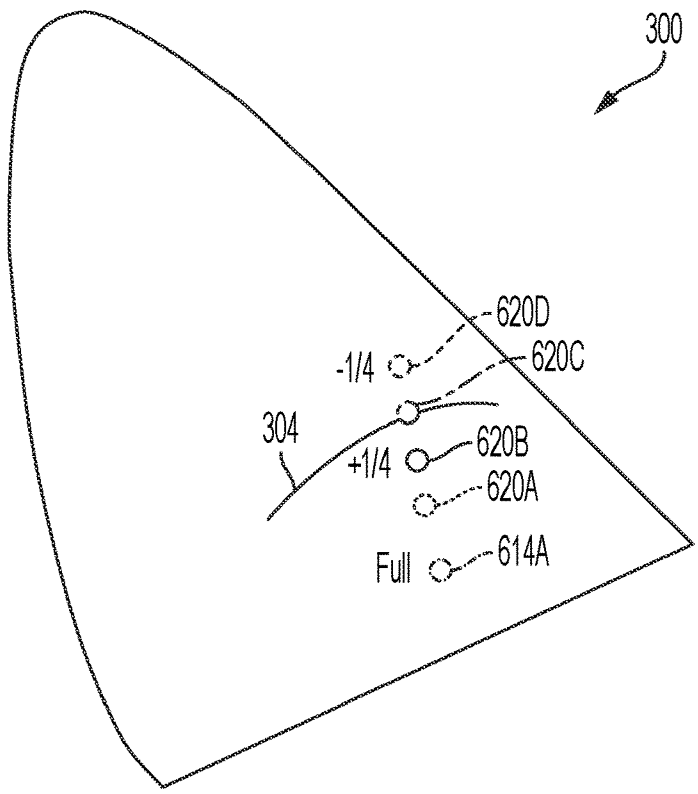
FIG. 11 is a graph of the CIE 1931 color space illustrating a chromaticity and various transparency variants thereof.
Figure 12:
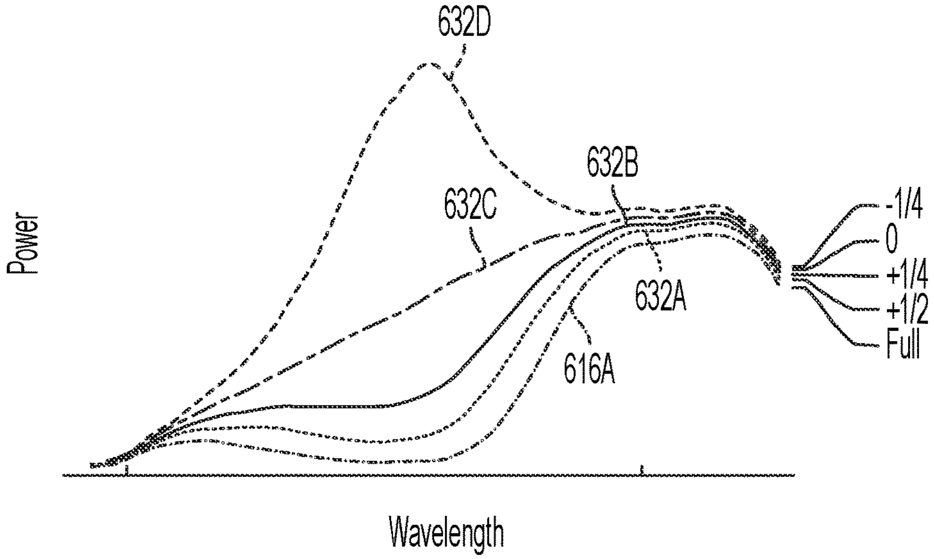
FIG. 12 is a graph of spectral power distributions of the chromaticity and various transparency variants of FIG. 11.

The third method is configured to simulate various thicknesses (i.e., transparency) of a physical filter. The multiplication and exponentiation are understood to be on a by-wavelength basis. Although a negative opacity is not achievable with a physical filter, such spectral solutions are possible utilizing the third method and EQN. 3. For example, EQN. 3 may determine an output spectral power distribution for a negative opacity. For a user-selected chromaticity, the closest point on the chromaticity locus is traced out by varying the opacity r and this value is used to compute the target spectrum $\vec{T}$ as above. See, for example, FIG. 11 that illustrates a reference chromaticity 614A and the corresponding transparency or opacity variant chromaticities 620A-620D. In the illustrated embodiment, chromaticity 620A corresponds to a ½ opacity of the chromaticity 614A and chromaticity 620B corresponds to a ¼ opacity of the chromaticity 614A. Likewise, chromaticity 620C corresponds to a zero opacity of the chromaticity 614A (i.e., the chromaticity 620C is located on the Planckian locus 304). In addition, chromaticity 620D corresponds mathematically to a negative ¼ opacity of the chromaticity 614A. The corresponding spectral power distributions are illustrated in FIG. 12. Specifically, the reference spectral power distribution 616A corresponds to the reference chromaticity 614A and the target spectral power distributions 632A-632D correspond to the target chromaticities 620A-620D, respectively.

Figure 13:
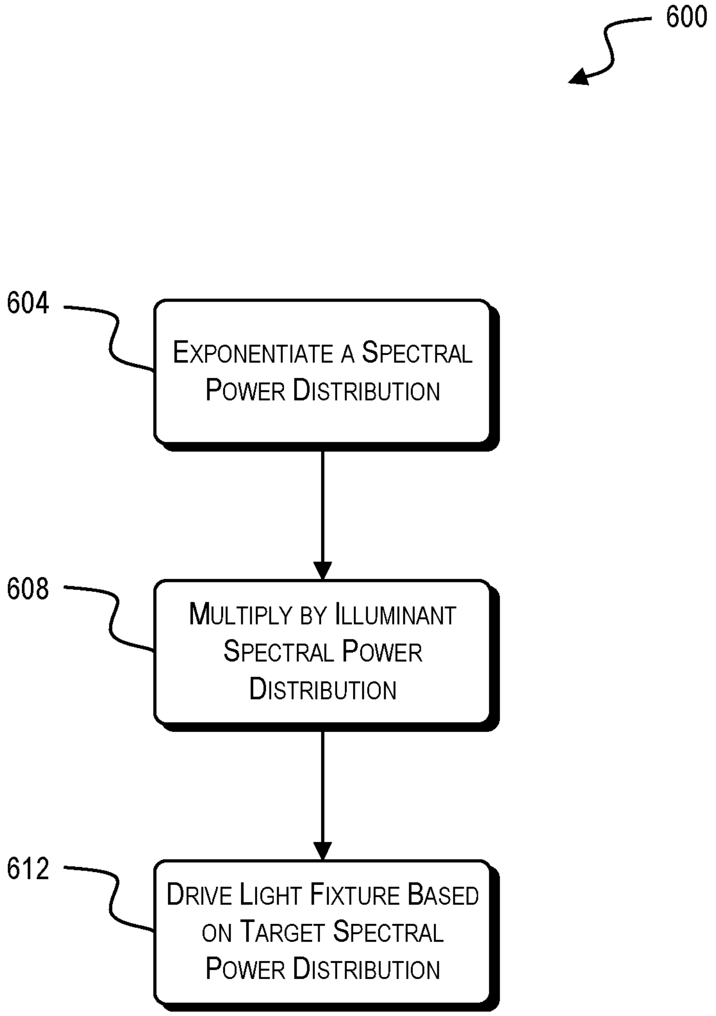
FIG. 13 is a flow diagram of a method for determining a target spectral power distribution.

FIG. 13 is a method 600 for controlling and operating the lighting fixtures 130-145 at the desired chromaticity with the desired output spectral power distribution. The method 600 includes exponentiating a first spectral power distribution (e.g., 616A) by an exponent to arrive at an exponential spectral power distribution (STEP 604). In some embodiments, the exponent corresponds to a user-selected opacity. Also, in some embodiments, the user-selected opacity is a negative value. The method 600 also includes multiplying the exponential spectral power distribution by an illuminant spectral power distribution, I, to arrive at the desired output spectral power distribution (e.g., 632A) at the desired chromaticity (e.g., 620A) (STEP 608). In some embodiments, the illuminant spectral power distribution corresponds to the spectral power distribution of a tungsten lamp. In some embodiments, STEP 604 and STEP 608 are combined into a single step, corresponding to EQN. 3. Next, at STEP 612, the plurality of light sources (i.e., the plurality of LEDs) within the lighting fixtures 130-145 are driven at intensities that correspond to the desired output spectral power distribution 632A.

With reference to all three described methods 400, 500, and 600, they provide methods for selecting the spectral content of a light in a controlled manner to change its rendering performance and visual perception at a given chromaticity. In some embodiments, the controller 200 is adaptive and anticipates the user's preferences as the user selects, computes, and stores cues, states, or settings throughout the color space. For example, a user may find themselves boosting the amber emitter in most cues, states, or settings because of, perhaps, the scene, venue, or desired mood or atmosphere. By using the existing user cues, states, or settings as the subset $\{\vec{S}_n\}$ in, for example EQN. 1, new cues, states, or settings can be generated at different chromaticities that would automatically contain a similar amber boost.

Various features and advantages are set forth in the following claims.

What is claimed is:

1. A method for operating a lighting fixture with a plurality of light sources at a target chromaticity with a target output spectral power distribution, the method comprising:

- determining a first distance between the target chromaticity and a first chromaticity with a first spectral power distribution;
- determining a second distance between the target chromaticity and a second chromaticity with a second spectral power distribution;
- scaling the first spectral power distribution by a first scaling factor to arrive at a first scaled spectral power distribution, the first scaling factor is based on the first distance;
- scaling the second spectral power distribution by a second scaling factor to arrive at a second scaled spectral power distribution, the second scaling factor is based on the second distance;
- adding the first scaled spectral power distribution and the second scaled spectral power distribution to arrive at the target output spectral power distribution at the target chromaticity; and
- driving the plurality of light sources at intensities corresponding to the target output spectral power distribution.

2. The method of claim 1, wherein the first distance is measured between MacAdam-ellipses corresponding to the target chromaticity and the first chromaticity in the CIE 1931 x-y color space.

3. The method of claim 1, wherein the first distance is the Euclidean distance between the target chromaticity and the first chromaticity in the CIE 1960 u-v color space.

4. The method of claim 1, wherein the first distance is the ΔE between the target chromaticity and the first chromaticity in the CIE L*a*b* color space.

5. The method of claim 1, wherein the first distance is a sum of an absolute difference of cartesian coordinates of the target chromaticity and the first chromaticity.

6. The method of claim 1, wherein the first scaling factor is based on a user preference.

7. The method of claim 6, wherein the user preference is an amount of a waveband in the output spectral power distribution.

8. The method of claim 1, wherein the first scaling factor is based on a weighting function.

9. The method of claim 8, wherein the weighting function is a polynomial function.

10. The method of claim 8, wherein the weighting function is an exponential or logarithmic function.

11. The method of claim 1, wherein the first chromaticity with the first spectral power distribution corresponds to a chromaticity and a spectral power distribution resulting from the use of a filter in front of an illuminant.

12. The method of claim 1, wherein the first chromaticity with the first spectral power distribution corresponds to a chromaticity and spectral power distribution of a tungsten lamp.

13. The method of claim 1, wherein the first chromaticity with the first spectral power distribution corresponds to a user-created spectral power distribution.

14. The method of claim 1, wherein the first chromaticity with the first spectral power distribution corresponds to a physical emission spectrum.

15. A method for operating a lighting fixture with a plurality of light sources at a target chromaticity with a target output spectral power distribution, the method comprising:

multiplying a first spectral power distribution by a second spectral power distribution to determine a product spectral power distribution;

multiplying the product spectral power distribution by an illuminant spectral power distribution to determine the target output spectral power distribution at the target chromaticity; and driving the plurality of light sources at intensities corresponding to the target output spectral power distribution.

16. The method of claim 15, wherein the product spectral power distribution corresponds to the spectral power distribution resulting from a combination of at least two filters in front of an illuminant.

17. The method of claim 15, wherein the illuminant spectral power distribution corresponds to the spectral power distribution of a tungsten lamp.

18. A method for operating a lighting fixture with a plurality of light sources at a target chromaticity with a target output spectral power distribution, the method comprising:

exponentiating a first spectral power distribution by an exponent to determine an exponential spectral power distribution;

multiplying the exponential spectral power distribution by an illuminant spectral power distribution to determine the target output spectral power distribution at the target chromaticity; and driving the plurality of light sources at intensities corresponding to the target output spectral power distribution.

19. The method of claim 18, wherein the exponent corresponds to a user-selected opacity.

20. The method of claim 19, wherein the user-selected opacity is a negative value.

21. The method of claim 18, wherein the illuminant spectral power distribution corresponds to the spectral power distribution of a tungsten lamp.

* * * * *